June 18, 1940.                B. R. BENJAMIN                2,204,650
                              TRACTION WHEEL
            Filed Dec. 24, 1936                2 Sheets-Sheet 2
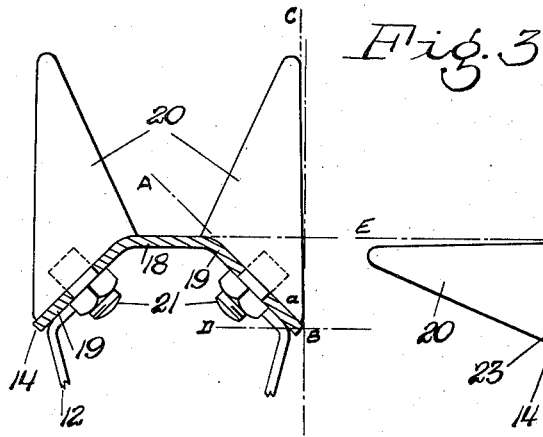
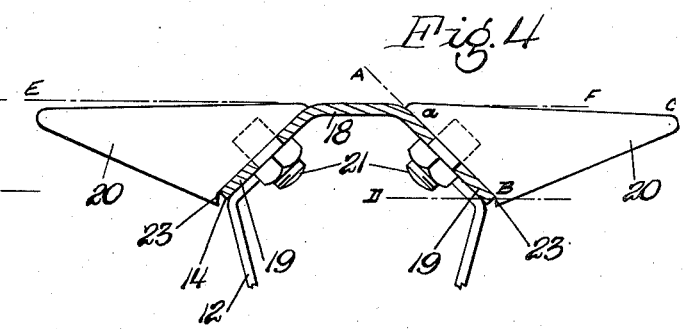
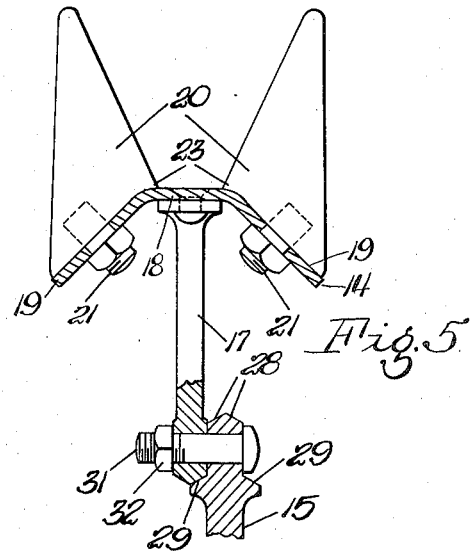
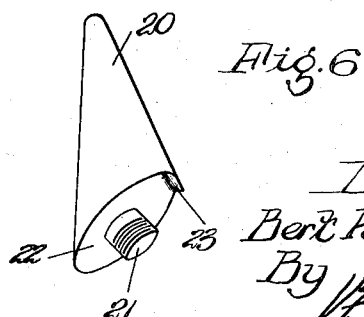
Inventor
Bert R. Benjamin
By
Atty.

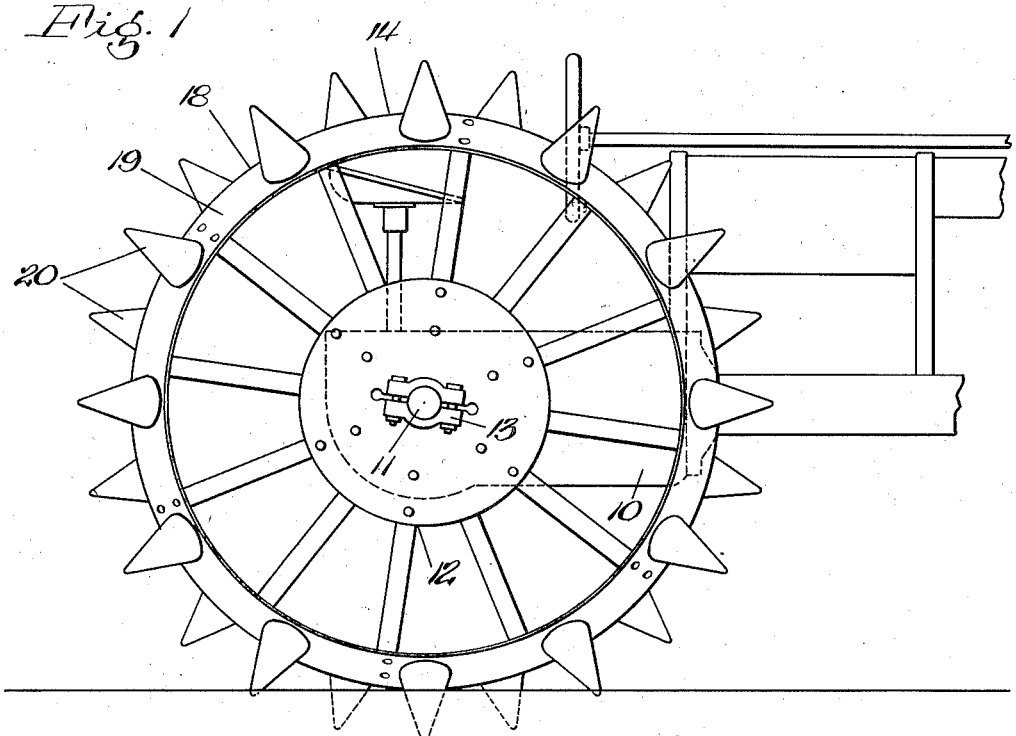
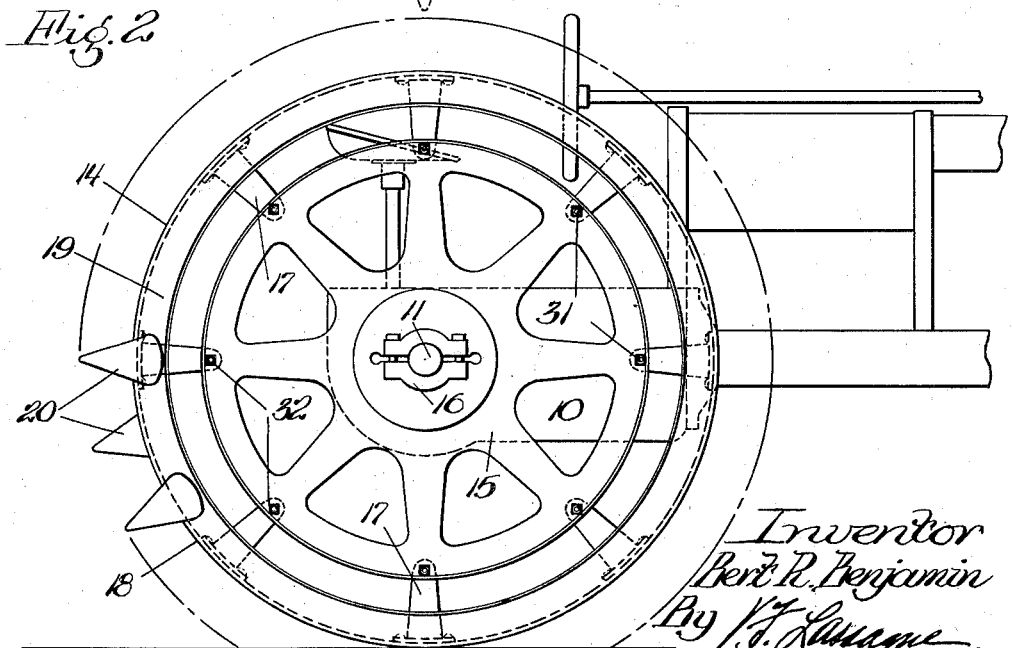

Patented June 18, 1940

2,204,650

UNITED STATES PATENT OFFICE 2,204,650

TRACTION WHEEL

Bert R. Benjamin, Oak Park, Ill., assignor to International Harvester Company, a corporation of New Jersey Application December 24, 1936, Serial No. 117,576

7 Claims. (Cl. 301—50)

This invention relates to a traction wheel, and more particularly to a novel type of rim or tread for a traction wheel.

Numerous problems have been encountered in the design and use of traction wheels, among the most difficult of which are those concerning the provision of a rim that will adapt itself to lugs that secure the most traction, that will be self-cleaning, and that will be practicable and easily interchanged from a lugged traction wheel. Various wheels have been designed to be used in one or two of many desirable operating forms, but none are believed to combine all desirable features in one universal wheel.

It is the principal object of this invention, therefore, to provide such a universally adaptable wheel.

Another important object is to provide suitable and efficient traction means for use on the wheel.

Another object is to provide means for securing traction means, such as lugs, to the wheel or rim for use in a plurality of operating positions.

Still another object is to provide means for securing traction means to the rim; and, another object is to provide a ground engaging member on a traction wheel for a tractor or the like, which will result in the most efficient operation of the tractor and which will provide for the reversible attachment of traction means thereto.

With these and other objects of greater and lesser importance in view, a preferred form of a traction wheel of the above mentioned type is provided and shown and disclosed in the following description and in the drawings, in which:

Figure 1 is a side elevational view of the rear portion of a tractor, showing the wheel and rim thereon and provided with one preferred form of traction means;

Figure 2 is a similar view, showing a preferred form of the wheel utilizing the interchangeability of the new rim;

Figure 3 is a vertical sectional view of the rim and the traction means shown in Figure 1, illustrating a preferred shape of the rim and the means for securing the traction means thereto, taken on a staggered section line to show the traction means on both sides of the rim;

Figure 4 is a similar sectional view, showing the traction means in another position and illustrating the conversion of the wheel to road use;

Figure 5 is a sectional view of the rim and traction means shown in Figure 2, showing the spacing means between the rim and a wheel; and, Figure 6 is a perspective view of one of the conical lugs as preferred for traction means for use with the rim.

As shown in Figures 1 and 2, the rear portion of a tractor is shown as having a rear body or transmission case 10. Extending through the transmission case 10 are the rear driving axles 11, only one of which is shown, driven through the power transmitting means (not shown) in the tractor.

As shown particularly in Figure 1, the axle 11 is provided with a traction wheel 12, secured to the axle 11 for rotation therewith by an adjustable hub 13.

A ground engaging member or rim 14 is secured to the spokes of the wheel and completes the wheel assembly.

As best shown in Figures 2 and 5, an interchangeable wheel, preferably of the cast type, is shown at 15, being adjustably secured to the axle 11 for rotation therewith by a hub 16. Spacing means 17 are removably secured to the wheel 15 and extend radially outwardly therefrom and are secured to the rim 14 for a purpose to be described later.

Looking again to the preferred form of the ground engaging member or rim shown in Figures 1, 2, 3, 4 and 5, the rim consists of an annular center, flat or tread portion 18 parallel to the axis of the wheel, or the section of a cylinder having as its axis the axis of the wheel, and a pair of angularly disposed annular side or wing portions 19 annularly sloping toward the axis of the wheel or inclined circumferentially outwardly and downwardly from the flat or tread portion. The annular sloping or wing portions 19 form secondary tread portions, and each annular side or wing portion is the section of a cone having as its axis the axis of the wheel. The rim 14 is preferably shaped from one piece.

As best shown in Figures 3 and 5, traction means are secured to the rim 14 and extend radially therebeyond, the traction means preferably being of the lug type, such as traction lugs 20. These lugs are provided with securing means or bolts and nuts 21 for securing same to the rim 14, as shown in Figures 3, 4, 5 and 6. Each lug is generally triangular in cross section in at least one plane, the altitude of the triangle formed by the cutting plane being substantially the axis of the lug, the base of the triangle and of the lug being substantially coincident and forming an acute angle with the lug axis or altitude. Each traction lug 20 is preferably formed in the shape of a cone for purposes of the inherent advantages therein and for other purposes to be disclosed later. Each lug 20 is preferably cast and the bolt 21 embedded or threaded therein.

As best shown in Figure 6, the conical traction lug 20 has a substantially flat base portion 22, which is adapted to seat on the annular sloping or wing portions 19 of the tractor rim 14. A portion of the base 22 extends into the axially inner-most boundary or element of the lug 20 to provide an angular or extending portion adapted to engage a portion of the outer peripheral edge of the flat or cylindrical portion 18 of the rim 14 (Figures 3 and 5), as at 23, when the wheel is operating as a traction wheel. This portion 23 serves as means to prevent the lug 20 from turning on the rim during operation of the wheel as a traction wheel.

The axially outer-most boundary or element of each lug 20, as best shown in Figure 3, forms with the base 22 of the lug an included angle "a". As will be further noted from an examination of Figures 3 and 4, an annular wing or sloping portion 19 forms an angle ABD with a line DB parallel to the axis of the wheel and the same plane. Since the line DB is parallel to the axis of the wheel, it will be referred to hereinafter as the axis of the wheel.

In the present disclosure of the preferred form of the invention, the angle ABD is 45 degrees, that angle being found to be substantially the theoretically perfect angle. It is important that the included angle "a" of the lug 20 be equal to or less than the angle ABD of the rim 14 for a purpose to appear in the description of the rim when the lugs 20 are turned to the retracted position or the position wherein the traction wheel is operating as a road wheel.

As best shown in Figure 4, the lugs 20 may be turned or retracted to the position shown and the wheel operated as a road wheel. In the present invention, it is not necessary to remove the lug 20 from the rim 14. Merely loosening the securing means 21 suffices to enable the lugs to be turned about on the wing or annular conical portions 19 so that the angular portion 23 of each lug will engage the axially outer-most edge of the wing portion 19 to prevent angular displacement of the lug about the bolt 21, as in Figure 4.

As previously mentioned, it is important that the included angle "a" be equal to or less than the angle ABD. The reason therefor will be apparent from an examination of Figure 4, wherein the lug 20 has been turned about on the securing means 21. The included angle "a" is now at the radially outer-most periphery of the rim 14, or substantially adjacent the flat or cylindrical portion 18.

As will be noted in Figure 4, the flat portion 18 has been extended, as it were, to show a construction or designating line EF. This line EF, of course, is parallel to the axis of the wheel, and in the same plane, and represents a cylinder passed through the periphery of the annular portion 18. Now, inasmuch as the included angle "a" is equal to the angle ABD, and the angle ABD is equal to the angle FAB because they are alternate interior angles of a transversal intersecting two parallel lines, the line C designating the axially outer-most boundary of each lug 20 will fall on or radially inwardly of the line EF.

It is apparent, then, that the angle "a" must be equal to or less, or not substantially greater, than the angle ABD to the end that the axially outer-most boundary of the lug, the circumferentially outer-most boundary when turned to the retracted position shown in Figure 4, will fall on or radially inside a cylinder passed through the periphery of the annular flat or cylindrical portion 18 of the rim 14. Thus, the wheel is supported entirely on the annular portion 18 when the wheel is to be operated as a road wheel over pavement or other surfaces, and it is desirable to protect the same. Further, were the lugs to extend radially beyond the flat portion 18, undue strains and stresses would be imparted to the lugs. To this end it is important that the acute angle formed by the outer edge of the lug 20 and the base 22 thereof be equal to or less than the acute angle formed between the wing portion 19 and the axis of the wheel. It is a part of the present invention to provide lugs that, in retracted position, are disposed within the aforesaid cylinder as passed through the periphery of the wheel; and lugs having materially smaller angles would obviously fall within the scope of invention, as would lugs including at "a" an angle equal to angle ABD. In a very soft, loose or sandy soil it would not be improper or impracticable to employ the lugs 20 in their retracted position on the rim 14, as shown in Figure 4, to gain traction. It will be readily seen that the lugs 20 may be easily turned to their retracted position or restored to their position for operation as peripheral traction means by means of the securing means or bolts 21, which cooperate with the lugs and the annular sloping or wing portions for securing the lugs thereto.

It will be apparent from the foregoing disclosure and the following claims that a new and improved traction wheel has been provided through the use of the particular traction and securing means as described. An important feature in the accomplishment of the previously mentioned objects of the invention is the provision of a rim adapted to secure more traction and to operate with more freedom of clinging soil, at the same time utilizing to full advantage its ready adaptation to reversibility of the lugs for use as a road wheel.

It will be understood that the rim, and the traction and securing means shown are of a preferred type, having been employed successfully in exacting tests. However, it is obvious that a multiplicity of other rims and traction and securing means therefor may be utilized in conjunction with the interchangeability feature of the invention without departing from the spirit thereof.

It will also be understood that, while conical lugs have been described and illustrated and have been employed in a practicable embodiment of the invention, the invention is by no means limited thereto. It is apparent that numerous shapes of lugs may be made that have the cone as their bases without actually being cones in the strict sense of the word. Further, it will be apparent that the shape of the rim cross-section may be changed without sacrificing the adaptability thereof to the traction means herein disclosed, or modifications thereof, and the benefits obtainable therefrom.

It is, therefore, the intent of the appended claims and part of the present invention and disclosure thereof to include any and all variations or modifications of traction means or rims hereinbefore described.

What is claimed is:

1. In a traction wheel, the combination of a rim therefor having an annular portion the section of a cylinder, and an integral annular portion the section of a cone, a conical traction lug adapted to be attached to the rim in a radially extending position and in an axially extending position and having its base seating on the second annular portion, the angle between the base and the axially outer-most element of the lug when the lug is disposed in radially extending position being equal to or less than the acute angle between the second annular portion and the axis thereof, and a single securing means cooperating with the lug and the second annular portion for attaching the lug thereto in the two aforesaid positions whereby the lug in one position extends radially beyond the first annular portion of the rim, and in the other position extends axially beyond the second annular portion and within the surface of a cylinder passed through the periphery of the first annular portion.

2. In a traction wheel, the combination of a rim therefor having an annular portion the section of a cylinder, and an integral annular portion the section of a cone, a traction lug adapted to be attached to the rim in a radially extending position and in an axially extending position and having its base seating on the second annular portion, the angle between the base and the axially outer-most boundary of the lug when the lug is disposed in radially extending position being equal to or less than the acute angle between the second annular portion and the axis thereof, and a single securing means cooperating with the lug and the second annular portion for attaching the lug thereto in the two aforesaid positions whereby the lug in one position extends radially beyond the first annular portion of the rim, and in the other position extends axially beyond the second annular portion and within the surface of a cylinder passed through the periphery of the first annular portion.

3. In a traction wheel, the combination of a rim therefor having an annular portion the section of a cylinder, and an integral annular portion sloping therefrom toward the axis of the wheel, a traction lug adapted to be attached to the rim in a radially extending position and in an axially extending position and having its base seating on the second annular portion, the angle between the base and the axially outer-most boundary of the lug when the lug is disposed in radially extending position being equal to or less than the acute angle between the second annular portion and the axis thereof, and a single securing means cooperating with the lug and the second annular portion for attaching the lug thereto in the two aforesaid positions whereby the lug in one position extends radially beyond the first annular portion of the rim, and in the other position extends axially beyond the second annular portion and within the surface of a cylinder passed through the periphery of the first annular portion.

4. In a traction wheel, the combination of a rim therefor having an annular portion the section of a cylinder, and an integral annular portion the section of a cone, a traction lug adapted to be attached to the rim in a radially extending position and in an axially extending position and having a base seating on the second annular portion, the angle between the base and the axially outer-most boundary of the lug when the lug is disposed in radially extending position being equal or less than the acute angle between the second annular portion and the axis thereof, an angular portion on the base, and a single securing means cooperating with the lug and the second annular portion for attaching the lug thereto in the two aforesaid positions whereby the lug in one position extends radially beyond the first annular portion with the angular portion of the base engaging said first annular portion, and in the other position extends axially beyond the second annular portion and within the cylindrical plane of the first annular portion and with the angular portion of the base engaging the axially outer-most edge of the second annular portion.

5. In a traction wheel, the combination of a rim therefor having an annular portion the section of a cylinder, and an integral annular portion the section of a cone, a conical traction lug adapted to be attached to the rim in a radially extending position and in an axially extending position and having its base seating on the second annular portion, the angle between the base and the axially outer-most boundary of the lug when the lug is disposed in radially extending position being equal to or less than the acute angle between the second annular portion and the axis thereof, an angular portion on the base, and a single securing means cooperating with the llug and the second annular portion for attaching the lug thereto in the two aforesaid positions whereby the lug in one position extends radially beyond the first annular portion with the angular portion of the base engaging said first annular portion, and in the other position extends axially beyond the second annular portion and within the cylindrical plane of the first annular portion and with the angular portion of the base engaging the axially outer-most edge of the second annular portion.

6. In a traction wheel, the combination of a rim therefor comprising an annular portion the section of a cylinder and a second annular portion integral therewith the section of a cone, a traction lug generally triangular in cross section in at least one plane, the altitude of the triangle being substantially the axis of the lug, the base of the triangle and of the lug being substantially coincident and forming an acute angle with the lug axis, said base seating on the second annular portion, and a single securing means cooperating with said base portion and the second annular portion of the rim for attaching the lug in two positions thereto whereby the lug in one position extends radially beyond the first annular portion, and in the other position extends axially beyond the second annular portion.

7. In a traction wheel, the combination of a rim therefor comprising an annular portion the section of a cylinder and a second annular portion integral therewith the section of a cone, a traction lug generally triangular in cross section in at least one plane, the altitude of the triangle being substantially the axis of the lug, the base of the triangle and of the lug being substantially coincident and forming an acute angle with the lug axis, said base seating on the second annular portion, the base of the lug being provided with an angular portion, and a single securing means cooperating with the base portion and the second annular portion of the rim for attaching the lug in two positions thereto whereby the lug in one position extends radially beyond the peripheral edge of the first annular portion of the rim with the angular portion of the base thereof engaging said first annular portion and in the other position extends axially beyond the second annular portion of the rim with said angular portion engaging the axially outermost peripheral edge of the second annular portion.

BERT R. BENJAMIN.